US011477205B2

(12) United States Patent
Pinson et al.

(10) Patent No.: US 11,477,205 B2
(45) Date of Patent: Oct. 18, 2022

(54) METHOD FOR SUPPLYING A SECURE CONNECTION PROXY

(71) Applicant: WALLIX, Saint-Honoré (FR)

(72) Inventors: Eric Pinson, Fontenay-sous-Bois (FR); Serge Adda, Antony (FR)

(73) Assignee: WALLIX, Saint-Honoré (FR)

( * ) Notice: Subject to any disclaimer, the term of this patent is extended or adjusted under 35 U.S.C. 154(b) by 608 days.

(21) Appl. No.: 16/318,059

(22) PCT Filed: Jul. 20, 2017

(86) PCT No.: PCT/FR2017/051999
§ 371 (c)(1),
(2) Date: Jan. 15, 2019

(87) PCT Pub. No.: WO2018/015681
PCT Pub. Date: Jan. 25, 2018

(65) Prior Publication Data
US 2021/0288969 A1 Sep. 16, 2021

(30) Foreign Application Priority Data

Jul. 20, 2016 (FR) .................................. 1656906

(51) Int. Cl.
H04L 9/40 (2022.01)
(52) U.S. Cl.
CPC ........ H04L 63/104 (2013.01); H04L 63/0281 (2013.01)

(58) Field of Classification Search
CPC ... H04L 63/104; H04L 63/0281; H04L 67/30; H04L 67/306
See application file for complete search history.

(56) References Cited

U.S. PATENT DOCUMENTS

| 5,768,519 | A | * | 6/1998 | Swift | H04W 12/086 709/223 |
| 7,587,499 | B1 | * | 9/2009 | Haghpassand | G06F 21/50 370/229 |
| 8,631,478 | B2 | * | 1/2014 | Chen | H04L 63/0281 726/6 |
| 9,326,189 | B2 | * | 4/2016 | Luna | H04L 67/306 |
| 9,787,657 | B2 | * | 10/2017 | Kottahachchi | H04L 63/083 |
| 10,097,650 | B2 | * | 10/2018 | Sharma | H04L 43/14 |

(Continued)

OTHER PUBLICATIONS

Coppolino, Luigi, and Luigi Romano. "Exposing vulnerabilities in electric power grids: An experimental approach." International Journal of Critical Infrastructure Protection 7.1 (2014): 51-60. (Year: 2014).*

(Continued)

Primary Examiner — Jung W Kim
Assistant Examiner — Sameera Wickramasuriya
(74) Attorney, Agent, or Firm — TraskBritt

(57) ABSTRACT

A method for automatically supplying a secure connection proxy with remote targets on the basis of privileged account data, includes a step of exploring, by a robot program, at least one domain for identifying the privileged accounts; a step of filtering the privileged accounts on the basis of criteria; steps of extracting characteristics from identified privileged accounts; and a step of supplying the proxy with the gathered data.

15 Claims, 2 Drawing Sheets

(56) References Cited

U.S. PATENT DOCUMENTS

| | | | |
|---|---|---|---|
| 2011/0023107 A1* | 1/2011 | Chen | H04L 63/0281 726/12 |
| 2011/0270850 A1* | 11/2011 | Wana | H04L 67/02 707/749 |
| 2012/0023546 A1* | 1/2012 | Kartha | H04L 63/104 726/1 |
| 2014/0068707 A1* | 3/2014 | Sakura | H04L 63/08 726/1 |
| 2015/0200821 A1* | 7/2015 | Sade | H04L 63/1408 709/224 |
| 2015/0200943 A1* | 7/2015 | Pitre | G06F 21/45 726/1 |
| 2015/0271200 A1* | 9/2015 | Brady | H04L 63/1416 726/4 |
| 2016/0006765 A1* | 1/2016 | Shem Tov | H04L 63/20 726/1 |
| 2017/0054744 A1* | 2/2017 | Mumcuoglu | H04L 63/1408 |

OTHER PUBLICATIONS

Moses, Samuel, Dale C. Rowe, and Sarah A. Cunha. "Addressing the Inadequacies of Role Based Access Control (RBAC) Models for Highly Privileged Administrators: Introducing the SNAP Principle for Mitigating Privileged Account Breaches." International Journal of Intelligent Computing Research. (Year: 2015).*
International Written Opinion for International Application No. PCT/FR2017/051999 dated Sep. 15, 2017, 5 pages.
International Search Report for International Application No. PCT/FR2017/051999 dated Sep. 15, 2017, 3 pages.

* cited by examiner

METHOD FOR SUPPLYING A SECURE CONNECTION PROXY

CROSS-REFERENCE TO RELATED APPLICATIONS

This application is a national phase entry under 35 U.S.C. § 371 of International Patent Application PCT/FR2017/051999, filed Jul. 20, 2017, designating the United States of America and published as International Patent Publication WO 2018/015681 A1 on Jan. 25, 2018, which claims the benefit under Article 8 of the Patent Cooperation Treaty to French Patent Application Serial No. 1656906, filed Jul. 20, 2016.

TECHNICAL FIELD

This disclosure relates to the field of application servers and, more particularly, processes and systems for accessing application resources hosted on one or more server(s) by a user.

BACKGROUND

To strengthen security against fraud and unintentional errors, terminals and the users thereof are subject to "privilege" management.

In this model, security is transferred from the terminal or access to the information system to the user himself/herself, as close as possible to the piece of data. Each user is thus assigned a "role," which will define his/her authorizations within the information system as well as the company itself, including access, modification, or even consultation rights, to each profile corresponds to a corpus of authorizations.

This approach has a two-fold preventive advantage: on the one hand, an incorrect operation or the access to a protected file is in principle impossible; on the other hand, it is curative, since any abnormal behavior can be automatically reported to the operators in order to correct it. If a maintenance workstation suddenly connects to accounting, there is probably an error or, at worst, a malicious attempt.

To achieve its full potential, this privilege management policy must be carefully defined and, above all, capable of embracing changes within the company. Over the course of his/her career, an employee's rights can evolve, just as the integration of a new application can lead to a questioning of established privileges. The finer the granularity of this policy, the more effective its results will be.

The field of the disclosure is more precisely that of computer systems combining a plurality of machines, with a secure management of access to each of the machines by one or more privileged accounts through a proxy.

Administrator users have "privileges" that standard users do not have. Without administrator privileges, it is impossible to install software, for example. Some user accounts (for example, the "root" account) have permanent administrator privileges. Administrator privileges allow important parts of the system to be modified if necessary, with safeguards to prevent the user from inadvertently changing them.

The specific problem addressed by the disclosure is, therefore, the processing of privileged accounts, the general context of which has been r discussed above.

Modern IT systems often use multiple privileged accounts to provide secure access to IT resources. The different types of privileged accounts can be implemented by a single system to provide different roles and/or access levels. For example, a user account may have different rights than an administrator account.

Due to the wide variety of types and/or roles, managing identification information and/or securing the multitude of accounts is tedious. In addition, the visualization and/or display of these accounts in a meaningful way may become a constraint.

Privileged accounts, such as administrator accounts, are initially defined in the proxy-managed domain, such as the Windows domain, for one or more machine(s).

The association of a system machine with a user having the necessary and sufficient rights to connect to it is usually done through a human-machine interface of the access security proxy, allowing the association between the different privileged accounts and the different target machines to be organized.

This interface makes it possible to supply the various privileged accounts manually using a form, or by downloading an account file. This interface also makes it possible to supply the different machines manually using a form, or by downloading a file.

Privilege accounts and machines are then matched by manual intervention by the operator according to his or her own judgement. This step results in the creation of a few hundred associations. Then, each time a new machine is declared, the operator creates a new association with one or more privileged account(s).

The US Patent Application US 2015/0200943, which describes a solution for retroactively associating one or more access policy/policies with an account which is not associated with at least one access policy, is also known in the state of the art. By combining an access policy with an account, access management to one or more resources provided by the account can be automated based on the associated access policy. An identity management system (IDM) can manage access policies to determine the access to the resources of the target systems. Accounts that are not associated with an access policy can be associated with the access policies governing access to the resources identified by these accounts. Access to the resource(s) associated with these accounts can be updated according to the access granted by the access policies associated with these accounts.

U.S. Pat. No. 5,768,519 is also known, which proposes a solution for merging a source domain and a target domain into a network, consisting in replacing a first account identification for each account associated with the source domain by a second account identification associated with the target domain. Then, for each account associated with the source domain, the first account ID is added to an account security data structure that stores account IDs that the account has already been associated with when it is associated with a former merged domain.

From the US Patent Application US 2015/0271200 is also known an alternative account management solution to resist some so-called "just-in-time" attacks, including an account management element adapted to receive a request from a first account via a client device for a second account to access a server device in a set of server devices, an account authorization element to authorize the request for the second account based, at least in part, on account information associated with the first account, an account provisioning element designed to provision the second account to allow a customer to access the server device, and an account notification element designed to provide account information associated with the second account to a customer through the client device. Other embodiments are disclosed and claimed.

The US 2015/0200943 patent application describes a solution for retroactively associating one or more access policy/policies with an account that is not associated with at least one access policy.

It is, therefore, a totally different context from that of the present disclosure, which, on the contrary, relates to the management of accounts already associated with an access policy, and more precisely the management of privileged accounts only.

The solution proposed by the US Patent Application US 2015/0200943 involves searching for a large number of accounts, i.e., all user accounts, and processing this large number of accounts without any distinction between "ordinary" user accounts and privileged accounts.

BRIEF SUMMARY

The purpose of the present disclosure is to provide a solution to automatically associate a remote machine with the most appropriate privileged account.

For this purpose, the disclosure provides a process for automatically supplying an access security proxy from the data of privileged accounts, the method including:
- a step of exploring by a robot program (i.e., a software application that runs automated tasks over a network and commonly referred to in the art as a "bot") at least one domain to identify privileged accounts;
- a step of filtering privileged accounts on the basis of criteria; and
- a step of supplying the proxy with the gathered data.

The method may further comprise the following steps:
- steps of extracting the characteristics of the identified privileged accounts; and
- steps of exploring the activity logs of the machines explored by each of the identified privileged accounts and associations between the machines explored and the most relevant usage account.

According to a first alternative solution, the data from the privileged accounts gathered is stored in a file to be used to supply the proxy.

According to a second alternative solution the gathered data from the privileged accounts is directly supplied to the proxy through an application programming interface.

BRIEF DESCRIPTION OF THE DRAWINGS

This disclosure will be best understood upon reading the following detailed description of a non-restrictive exemplary embodiment, while referring to the accompanying drawings, wherein.

DETAILED DESCRIPTION

Figure 1:
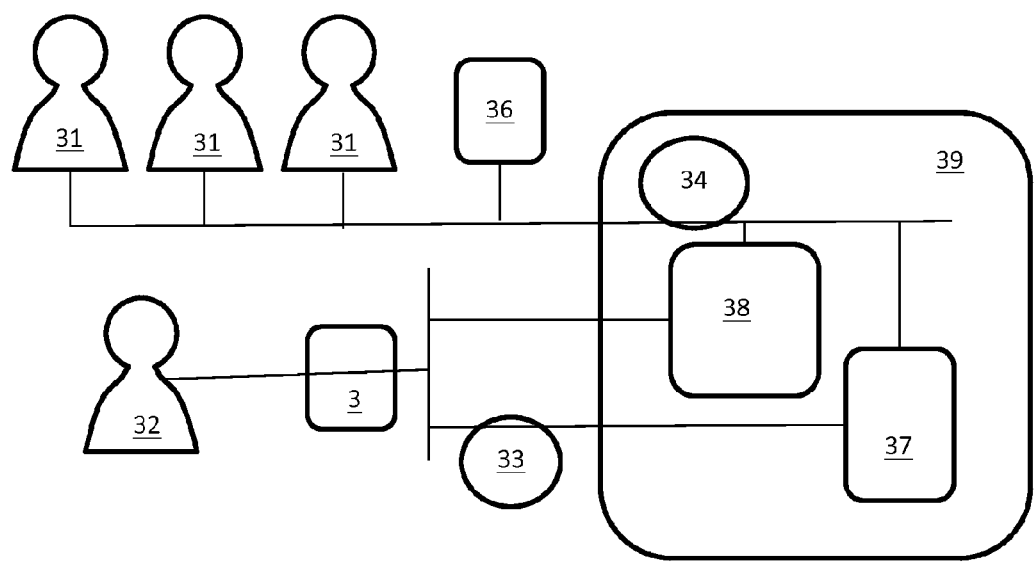
FIG. 1 shows the general hardware architecture of a computer system.

FIG. 1 shows a schematic view of an information system, for example, the information system of a company or an organization.

"Ordinary" users 31 have simple access rights that authorize them to access data in a memory space accessible to them or to run applications stored in a server 39 through, for example, an Internet Download Manager (IDM) application 36 that manages downloads of contents from the server 39 over the Internet.

A particular category of users 32 have privileged accounts that also allow them to perform administrative tasks, such as changing the rights of ordinary users 31 or creating new user accounts, or to modify a program or install or remove a program.

These users 32 access both common resources using a normal session 38, and, occasionally, a session with a privileged account 37, via a proxy 3 and an administration network 33 different from the production network 34.

The proxy gateway works like a network gateway: it is placed between the client and the server and inspects traffic at the application level. Full access to the inspected traffic gives the gateway control over the protocol functions and allows the gateway to restrict or allow access to specific protocol channels, enable terminal sessions in Secure Shell (SSH) but disable port or file forwarding, or allow desktop access for the remote desktop protocol but disable file and printer sharing.

Proxy gateways can operate transparently in the network and are independent of the client and the monitored server. This prevents anyone from changing the extracted audit information since server administrators do not have access to the proxy gateway. Some solutions even make it possible to store audit trails in encrypted, time-stamped and digitally signed format so that even the gateway administrator cannot alter the audit trails. Thanks to their transparency, proxy gateways require only minimal changes to the existing IT environment. As they are located at the network level, users can continue to use the client applications to which they are accustomed without changing their work habits. Proxy gateways can actually intervene in traffic, due to their central position relative to the monitored network traffic. This makes it possible, for example, to ask the user to authenticate himself/herself on the gateway, or to stop the connection until authorized by a competent person. The user's work can be monitored in real time, thanks to traffic reports to the person in charge. It is also possible to extract the files transferred to the server and to store them with the audit trails for later viewing.

The present disclosure relates to the automatic supplying of the proxy 3.

Figure 2:
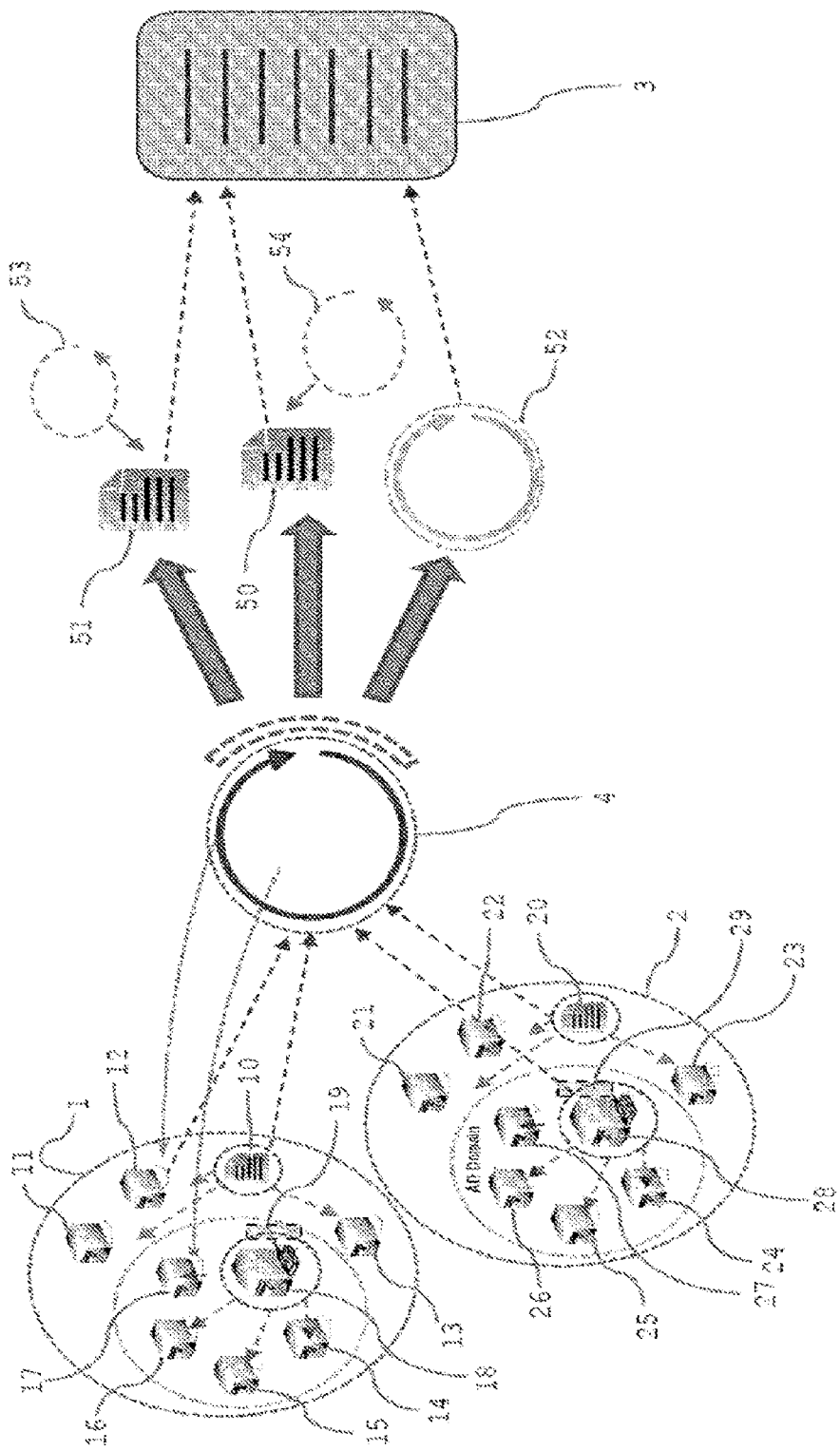
FIG. 2 shows the general hardware architecture of a computer system according to the disclosure.

The computer system as illustrated in FIG. 2 includes two exploration perimeters or domains 1, 2 comprising respective sets of machines 11 to 18 and 21 to 28 connected by a computer network, for example, Ethernet or Internet.

In each of the exploration perimeters 1, 2, one of the machines 18, 28 provides directory server functionalities, for example, on WINDOWS®, through ACTIVE DIRECTORY®. The directory 19, 29 lists all the machines 14 to 18 and 24 to 28 of the domain 1, 2 and the information relating to the accounts of the respective domain 1, 2.

The directory 19, 29 includes the saving of a list of accounts comprising information such as a user's identifier, information about his or her identity, group membership, and information about privileges, such as administration information.

The directory 19, 29 includes the saving of another list, different from the list of accounts, comprising information such as the identifier of a machine and the technical characteristics thereof.

These two lists are independent, with no functional relationship being listed in the directory.

Each of the machines in a domain can also have accounts with purely local privileges that are not known to the domain and, therefore, not saved in the directory 19, 29.

The problem solved by the present disclosure relates to the association of these machines with the most appropriate privileged accounts and thus aims at creating relationships between the two lists of accounts and machines, in order to enable the automatic supplying of accesses provided by a proxy 3 for securing remote connections.

To this end, the present disclosure involves executing, under the control of an operator from a man-machine interface, or on the textual command line, auto-discovery of the privileged accounts and machines registered in the different domains 1, 2 and an auto-determination or auto-deduction of the most appropriate matching of the privileged accounts and machines in each of the domains 1, 2.

For this purpose, a robot program 4 is executed on one of the machines 14 to 18 or 24 to 28 in each of the domains 1, 2. The robot program 4 queries the respective directory 19, 29 to retrieve the list of identifiers of users belonging to groups indicated as having privileges and the identifier of all the machines in the corresponding domain 1, 2. This information is temporarily stored in a memory device. With regard to the machines 11 to 13 and 21 to 23 in the domain that are not listed in the directory 19, 29, this information resulting from the step of querying the directory 19, 29 by the robot program 4 is completed from an independent file 10, 20 in XML format saved in parallel with the step of querying machines saved in the directory 19, 29.

The robot program 4 then performs a remote connection to each of the machines identified in the previous step, and performs a query to retrieve privileged account rights information for the respective machine, identify purely local privileged accounts with the machine, and gather the corresponding activity log information.

This information is also temporarily stored in a memory device.

The remote connection mode using this robot program 4 is based on Windows API® functionalities in order to guarantee the preservation of security.

The information gathered is then filtered using parameters that define a subset of privileged accounts. These parameters are for example:
membership in a standard group;
membership in a group defined by its name; and
the benefit of a predetermined privilege.

The filter can combine several parameters by logical operators.

An optimal association between the machines and the accounts selected upon completion of the filtering step is then calculated. This calculation takes into account the data from the activity logs to determine the best combinations, for example, by weighting by the number of connections of the account on a machine, or the date of the most recent connection of the account on the machine.

Upon completion of these steps, the robot program 4 provides:
a set of files 50 in csv format allowing the proxy 3 to be supplied for the secure connection;
a set of files 51 the model of which can be configured by the operator; and
an automatic supply of the proxy 3 through a dedicated application programming interface 52.

In addition, in the case of file generation, the operator can define a command to be executed when the file production 53, 54 is completed.

The invention claimed is:

1. A method for automatically supplying a secure connection proxy with remote targets on the basis of privileged account data, the method comprising:
a step of exploring, by a robot program, at least one domain to identify privileged accounts already associated with an access policy, the step of exploring comprising:
connecting remotely, by the robot program, to machines within the domain; and
retrieving activity log information of the machines;
a step of filtering the identified privileged accounts on the basis of predetermined parameters that define a subset of privileged accounts;
steps of calculating associations between the filtered privileged accounts and the machines responsive to the activity log information;
a step of supplying the secure connection proxy with the calculated associations; and
a step of establishing a privileged session between one or more of the machines and a server responsive to at least one of the calculated associations.

2. The method of claim 1, wherein the calculated associations are recorded in a file intended for supplying the secure connection proxy.

3. The method of claim 1, wherein the calculated associations directly supplies to the secure connection proxy through an input application programming interface.

4. The method of claim 1, wherein the activity log information comprises a number of connections of at least one of the identified privileged accounts on a machine and a date of a recent connection between the at least one identified privileged account and the machine.

5. The method of claim 1, wherein the predetermined parameters comprise:
membership in a standard group;
membership in a group defined by its name; and
benefits of a predetermined privilege.

6. The method of claim 1, wherein the step of filtering comprises combining a plurality of the predetermined parameters by logical operators.

7. The method of claim 1, wherein the established privileged session enables a user to perform at least one of:
changing rights of ordinary users;
creating new user accounts; and
modifying, installing, or removing a program.

8. The method of claim 1, wherein calculating associations comprises:
determining an optimal association between at least one of the machines and at least one of the filtered privileged accounts by:
weighting a number of connections of the at least one filtered privileged account on the at least one machine; and
weighting a most recent connection date between the at least one filtered privileged account and the at least one machine.

9. A method for automatically supplying a secure connection proxy with remote session on a server on the basis of privileged account data, the method comprising:
exploring at least one domain comprising at least two computers using a robot program to identify privileged accounts already associated with an access policy, the exploring comprising:
connecting remotely using the robot program to the at least two computers within the domain; and retrieving activity logs of the at least two computers;

filtering the identified privileged accounts on the basis of predetermined parameters that define a subset of privileged accounts;

calculating, by the robot program, associations between the filtered privileged accounts and the at least two computers responsive to the activity logs;

supplying the secure connection proxy using the associations calculated by the robot program; and establishing a secure remote connection between one or more of the at least two computers and a server responsive to at least one of the calculated associations.

10. The method of claim 9, further comprising:

exploring the activity logs of the at least two computers of the explored at least one domain for each of the identified privileged accounts, and associating the at least two computers of the explored at least one domain and with the identified privileged accounts, respectively, on the basis of an amount of usage of the at least two computers by the identified privileged accounts; and supplying the secure connection proxy using data gathered by the robot program while exploring the activity logs of the at least two computers and the associations between the at least two computers and the identified privileged accounts.

11. The method of claim 9, wherein data gathered by the robot program is recorded in at least one file supplied to the secure connection proxy.

12. The method of claim 9, wherein data gathered by the robot program is supplied to the secure connection proxy through an input application programming interface.

13. The method of claim 9, wherein the activity logs comprise a number of connections of at least one identified privileged account on at least one computer and a date of a recent connection between the at least one identified privileged account and the at least one computer.

14. The method of claim 9, wherein the secure remote connection enables a privileged user to modify rights of ordinary users, create new user accounts, or modify, install, or remove programs on the computer with which a secure remote connection exists.

15. The method of claim 9, wherein calculating associations comprises:

determining an optimal association between at least one of the computers and at least one of the filtered privileged accounts by:

weighting a number of connections of the at least one filtered privileged account on the at least one computer; and weighting a most recent connection date of the at least one filtered privileged account on the at least one computer.

* * * * *